(12) United States Patent
Kurata

(10) Patent No.: US 11,947,171 B2
(45) Date of Patent: Apr. 2, 2024

(54) OPTICAL WAVEGUIDE ELEMENT AND MANUFACTURING METHOD THEREOF

(71) Applicant: Nippon Telegraph and Telephone Corporation, Tokyo (JP)

(72) Inventor: Yu Kurata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 343 days.

(21) Appl. No.: 17/437,666

(22) PCT Filed: Apr. 8, 2020

(86) PCT No.: PCT/JP2020/015805
§ 371 (c)(1),
(2) Date: Sep. 9, 2021

(87) PCT Pub. No.: WO2020/209284
PCT Pub. Date: Oct. 15, 2020

(65) Prior Publication Data
US 2022/0163738 A1    May 26, 2022

(30) Foreign Application Priority Data
Apr. 11, 2019 (JP) ................................ 2019-075363

(51) Int. Cl.
*G02B 6/42* (2006.01)

(52) U.S. Cl.
CPC ........... *G02B 6/4214* (2013.01); *G02B 6/423* (2013.01); *G02B 6/425* (2013.01)

(58) Field of Classification Search
CPC ....... G02B 6/4214; G02B 6/423; G02B 6/425
See application file for complete search history.

(56) References Cited

U.S. PATENT DOCUMENTS

| 7,373,051 B2 * | 5/2008 | Ide ..................... G02B 6/29368 385/47 |
| 10,025,044 B1 * | 7/2018 | Masuda ............... G02B 6/4245 |
| 2008/0083699 A1 * | 4/2008 | Brooks ................ B23K 26/066 216/24 |

FOREIGN PATENT DOCUMENTS

JP            2005-70365 A    3/2005

* cited by examiner

*Primary Examiner* — Daniel Petkovsek
(74) *Attorney, Agent, or Firm* — Workman Nydegger

(57) ABSTRACT

There is provided an optical waveguide component capable of implementing highly efficient optical coupling of an optical element and suppressing a crosstalk between channels in performing hybrid integration. A PLC as an optical waveguide component employing an offset structure includes an input-output unit using a local portion of an inclined surface on the side of a core in an inclined groove of an optical path conversion unit to be loaded with an optical element as a mirror surface. The inclined groove is formed to be deeper than the core in a direction intersecting an emission direction of an optical signal in the core and perpendicular to a horizontal direction of a substrate. An offset unit in the horizontal direction of the substrate is provided to communicate with the inclined groove on the side of an opposite inclined surface opposing the mirror surface as the local portion of the inclined surface. When the mirror surface is coated with a reflective film via an offset unit, the reflective film can be accurately and simply formed.

12 Claims, 11 Drawing Sheets

OPTICAL WAVEGUIDE ELEMENT AND MANUFACTURING METHOD THEREOF

TECHNICAL FIELD

The present invention relates to an optical waveguide component using a planar lightwave circuit (hereinafter referred to as PLC), and specifically to an optical waveguide component including an optical path conversion unit suitable for mounting of an optical element and applicable to an optical communication system and a method of manufacturing the same.

BACKGROUND ART

In recent years, techniques for integrating many optical elements in high density have been required as an optical fiber transmission technique has spread. In one of such techniques, a quartz-based PLC as an optical waveguide component has been known. The PLC is a waveguide-type optical device having excellent characteristics such as a low loss, a high reliability, and a high degree of design freedom. Actually, a PLC in which respective functions of a multiplexer-demultiplexer, a divider-coupler, and the like are integrated is loaded into a transmission apparatus at an optical communication-transmission end.

Optical elements such as a photo diode (hereinafter referred to as PD) and a laser diode (hereinafter referred to as LD) that convert light and an electrical signal into each other have also been respectively loaded as optical devices other than the PLC into the transmission apparatus. Further, toward an increase in a communication capacity, a highly functional optoelectronic integration-type device in which an optical waveguide such as a PLC that processes an optical signal and an optical device such as a PD that performs photoelectric conversion has been required.

As a platform of such an optoelectronic integration-type device, a PLC shows promise. An example of a well-known technique for such a PLC is "OPTICAL WAVEGUIDE COMPONENT AND METHOD OF MANUFACTURING THE SAME" in which respective chips of a PD and a PLC are hybrid integrated (see Patent Literature 1).

CITATION LIST

Patent Literature

Patent Literature 1: Japanese Patent Laid-Open No. 2005-70365

In the Patent Literature 1, a 45-degree mirror as an optical path conversion unit is provided in a partial region of an optical waveguide, and the PD is mounted on the optical waveguide. As a result, a technique for vertically converting an optical path of light that propagates through the optical waveguide using the 45-degree mirror and performing optical coupling to the PD is disclosed.

An optoelectronic integration-type device in which an optical path conversion unit for optical coupling and an optical element such as a PD are mounted on a PLC has an advantage in terms of a reduction in size and a degree of freedom of a circuit design. Further, in recent years, in a PLC having a multiplexing-demultiplexing function of an optical signal to further increase a communication capacity, a function of being able to couple a plurality of arrayed optical elements to have a low loss and increase the number of channels has been required for the optoelectronic integration-type device.

SUMMARY OF THE INVENTION

Technical Problem

A case where light an optical path of which has been converted by the optical path conversion unit is emitted from the PLC, for example, is assumed in the optical waveguide component that is the optoelectronic integration-type device disclosed in the above-described Patent Literature 1. In this case, light that propagates through a clad upon leaking out of a core as a light passage causes a crosstalk between channels. Such light (hereinafter referred to as stray light) basically needs to avoid its optical path being converted by the optical path conversion unit.

A technique for taking measures against stray light has also been considered. An example is a case where a light shielding plate that prevents reflected light other than signal light is provided on a surface of an optical waveguide in a PLC in the vicinity of an optical path conversion unit. FIG. 1 is a perspective view illustrating a PLC 10A employing a structure having measures against stray light as an optical waveguide component that is a well-known optoelectronic integration-type device (a structure easily conceivable by those skilled in the art, although not a commonly known invention).

With reference to FIG. 1, a PLC 10A is configured by coating an upper surface of a substrate (wafer) 1 made of silicon, silicon dioxide, or the like with a thin film made of silicon dioxide or the like to form an optical waveguide 2. The optical waveguide 2 is formed by depositing respective thin films of an under clad 2a, a core 3, and an over clad 2b in this order on a surface of the substrate 1. In the optical waveguide 2, the under clad 2a and the over clad 2b can be together considered as a clad covering the core 3. As a common example, if the respective film thicknesses of the under clad 2a and the over clad 2b are set to approximately 20 μm, the film thickness of the core 3 therebetween is selected in a range of approximately 3 to 10 μm.

In the PLC 10A, a plurality of (a total of 5 in FIG. 1) light shielding units 5 are further provided side by side for respective peripheries of portions extending in a linear shape of the substantially S-shaped core 3 in the vicinity of the optical path conversion unit 4 as a structure having measures against stray light. The light shielding units 5 are formed by forming a plurality of light shielding grooves for the over clad 2b of the optical waveguide 2 and then filling each of the light shielding grooves with a light shielding material. In the PLC 10A illustrated in FIG. 1, when an end surface of a short side illustrated on the front side is for optical input of the core 3, the optical path conversion unit 4 is formed on the emission side of the core 3 in the optical waveguide 2.

A detailed configuration will be described. In the structure having measures against stray light illustrated in FIG. 1, the light shielding units 5 are respectively arranged on both sides of the above-described portions extending in a linear shape of the core 3 corresponding to four channels. Such an arrangement enables, when light that propagates through the core 3 is reflected by the optical path conversion unit 4 so that its optical path is converted, reflected light other than signal light to be prevented. The optical path conversion unit 4 is formed by coating a portion as a mirror surface in an inclined surface of a dedicated inclined groove formed in the optical waveguide 2 with a metal reflective film such as an aluminum film.

However, in the structure having measures against stray light, it is necessary to separately provide a dedicated light shielding groove and fill the light shielding groove with a light shielding material to produce the light shielding unit 5. This cannot avoid requiring a complicated process in manufacturing processes, and further requires a space to be ensured for that purpose. Such a configuration makes reduction in size and simplification of mounting that are required for the optoelectronic integration-type device difficult.

Further, as another example, a configuration in which a dedicated mirror for stray light reduction is provided to emit stray light into a space and stray light is removed from a plane of an optical waveguide in a PLC is also considered.

However, when such a configuration is applied, stray light emitted to the space may be mixed with signal light. Accordingly, the configuration cannot be basically said to be an appropriate method for avoiding occurrence of a crosstalk.

In short, when hybrid integration with an optical element using a PLC as a platform is performed in a well-known optical waveguide component, it is difficult to embody an item to be required in an actual situation. The item to be required is a function of implementing highly efficient optical coupling of an optical element to be mounted and enabling a crosstalk between channels to be suppressed.

The present invention has been made to solve such a problem. A technical problem of the present invention is to provide an optical waveguide component capable of implementing highly efficient optical coupling of an optical element and enabling a crosstalk between channels to be suppressed in performing hybrid integration and a highly accurate and simple manufacturing method.

Means for Solving the Problem

To achieve the above-described object, an aspect of the present invention provides an optical waveguide component including an optical waveguide provided on an upper surface of a substrate and including a core and a clad covering the core and an optical path conversion unit that is formed in a part of the optical waveguide and converts an optical path of an optical signal and inputs and outputs the optical signal to and from an optical element to be mounted, in which the optical path conversion unit includes an input-output unit using as a mirror surface a local portion of an inclined surface on the side of the core in an inclined groove formed to be deeper than the core in a direction intersecting an emission direction of the optical signal in the core and perpendicular to a horizontal direction of the substrate, an offset unit in the horizontal direction of the substrate is provided to communicate with the inclined groove on the side of an opposite inclined surface opposing the mirror surface in the inclined groove, and the offset unit is formed such that a distance between a region exceeding the opposite inclined surface on an extension line of the core intersecting the mirror surface and the mirror surface is longer than a distance between a region other than the region exceeding the opposite inclined surface and the mirror surface.

To achieve the above-described object, another aspect of the present invention provides a method of manufacturing an optical waveguide component including an optical waveguide provided on an upper surface of a substrate and including a core and a clad covering the core and an optical path conversion unit that is formed in a part of the optical waveguide and converts an optical path of an optical signal and inputs and outputs the optical signal to and from an optical element to be mounted, the method including an optical path conversion unit formation step for forming for the optical waveguide an inclined groove to be deeper than the core in a direction intersecting an emission direction of the optical signal in the core and perpendicular to a horizontal direction of the substrate and forming the optical path conversion unit to include an input-output unit using as a mirror surface a local portion of an inclined surface on the side of the core in the inclined groove, and an offset unit formation step for providing for the optical waveguide a groove on the side of an opposite inclined surface opposing the mirror surface of the inclined groove and forming an offset unit in the horizontal direction of the substrate to communicate with the inclined groove, in which in the offset unit formation step, the offset section is formed such that a distance between a region exceeding the opposite inclined surface on an extension line of the core intersecting the mirror surface and the mirror surface is longer than a distance between a region other than the region exceeding the opposite inclined surface and the mirror surface.

Effects of the Invention

According to the present invention, with the above-described configuration, an optical waveguide component capable of implementing highly efficient optical coupling of an optical element and enabling a crosstalk between channels to be suppressed in performing hybrid integration is obtained. By processes in the above-described method, the optical waveguide component is accurately and simply produced.

DESCRIPTION OF EMBODIMENTS

An optical waveguide component and a method of manufacturing the same according to the present invention will be specifically described below with reference to the drawings by way of some embodiments.

Embodiment 1

Figure 2:
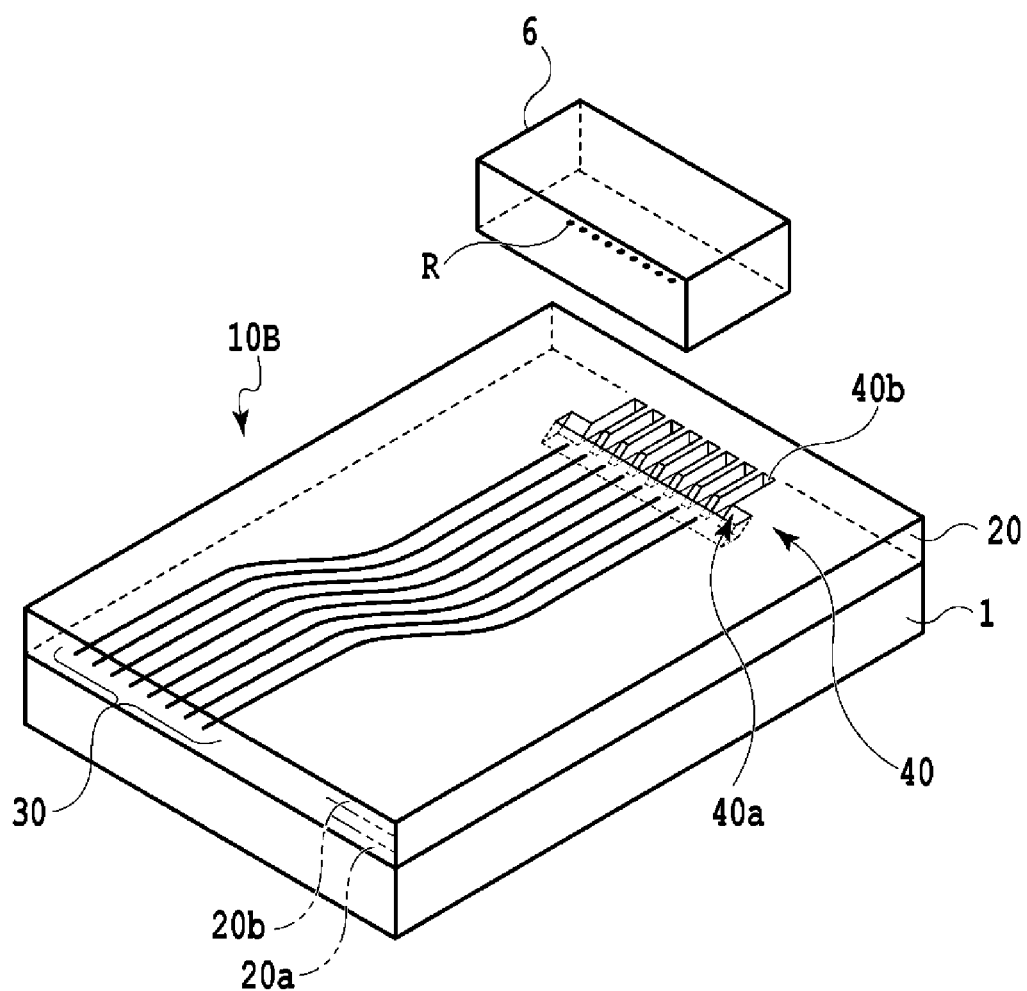
FIG. 2 is a perspective view illustrating a PLC employing an offset structure as an optical waveguide component that is an optoelectronic integration-type device according to an embodiment 1 of the present invention, including a PD as an optical element to be mounted.
Figure 3:
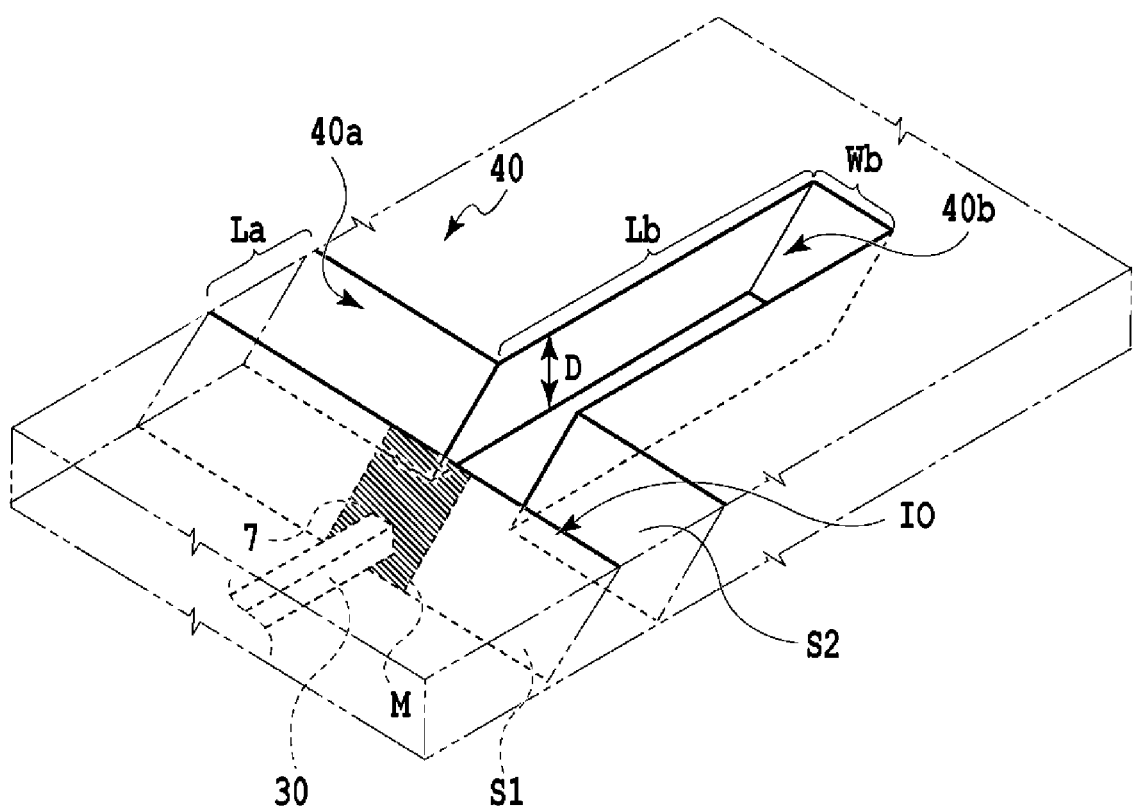
FIG. 3 is an enlarged perspective view illustrating, partly in section and in phantom, a basic structure of an optical path conversion unit included in the PLC illustrated in FIG. 2.

FIG. 2 is a perspective view illustrating a PLC 10B employing an offset structure as an optical waveguide component that is an optoelectronic integration-type device according to an embodiment 1 of the present invention, including a PD 6 as an optical element to be mounted. FIG. 3 is an enlarged perspective view illustrating, partly in section and in phantom, a basic structure of an optical path conversion unit 40 included in the PLC 10B.

Figure 1:
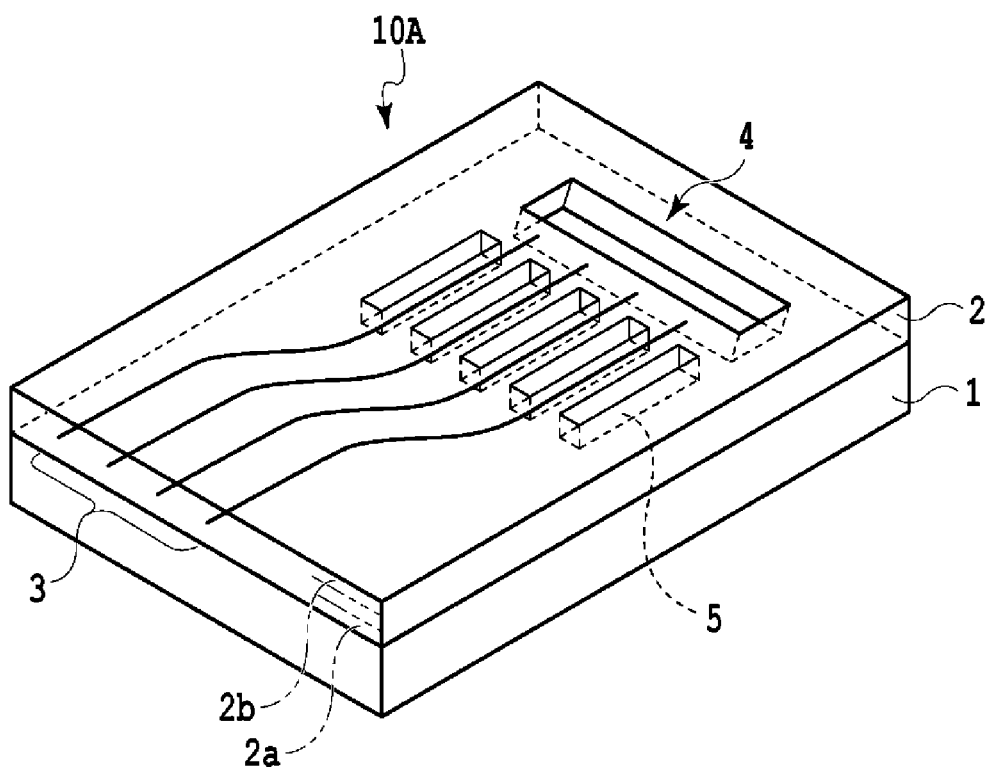
FIG. 1 is a perspective view illustrating a PLC employing a structure having measures against stray light as an optical waveguide component that is a well-known optoelectronic integration-type device.

With reference to FIG. 2, the PLC 10B differs from the PLC 10A illustrated in FIG. 1 in that the core 30 is enlarged as one corresponding to eight channels and in that an offset structure is employed for the optical path conversion unit 40 to be formed in a part of the optical waveguide 20. In addition, a surface-type high-speed PD 6 corresponding to a plurality of channels as an optical element in which a plurality of light reception units R are provided side by side is loaded into the optical path conversion unit 40 in the optical waveguide 20 and is configured as the optoelectronic integration-type device.

The PLC 10B itself is configured by covering an upper surface of a substrate (wafer) 1 made of silicon, silicon dioxide, or the like with respective thin films of an under clad 20a, the core 30, and an over clad 20b to form the optical waveguide 20. For the PLC 10B illustrated in FIG. 2, when an end surface of a short side on the front side is used for optical input of the core 30, the optical path conversion unit 40 is also formed on the emission side of the core 30 in the optical waveguide 20. Each of units in the PLC 10B will be described below using a direction of long sides and a direction of short sides, respectively, as a length and a width in a horizontal direction of the substrate 1.

Further with reference to FIG. 3, an inclined groove 40a is formed for forming the optical path conversion unit 40 in the optical waveguide 20. The optical path conversion unit 40 includes an input-output unit IC using a local portion of an inclined surface S1 on the side of the core 30 in the inclined groove 40a as a mirror surface M. The inclined groove 40a is formed to be deeper than the core 30 in a direction intersecting an emission direction of an optical signal in the core 30 and perpendicular to a horizontal direction of the substrate 1. In the inclined groove 40a, an offset unit 40b in the horizontal direction of the substrate 1 is provided to communicate with the inclined groove 40a on the side of an opposite inclined surface S2 opposing the mirror surface M as the local portion of the inclined surface S1. Eight offset units 40b are provided to respectively correspond to the eight channels of the core 30.

That is, in the PLC 10B, the inclined groove 40a for forming the optical path conversion unit 40 includes the inclined surface S1 at a previously set angle and the opposite inclined surface S2 at the same angle opposing the inclined surface S1 with the horizontal direction of the substrate 1 used as a reference. The angle to be set here is generally selected in a range of 30 to 60 degrees. The local portion on the side of the core 30 of the inclined surface S1, which intersects the emission direction of the optical signal in the core 30, of the inclined groove 40a is set as the mirror surface M, to perform optical path conversion by the reflective film 7 formed on the mirror surface M. Such a configuration indicates that the reflective film 7 is provided only in a region of the local portion of the inclined surface S1 on which input-output light is reflected in the input-output unit IC in the optical path conversion unit 40 formed in the optical waveguide 20. The offset unit 40b is formed to communicate with the inclined groove 40a on the side of the opposite inclined surface S2 opposing the mirror surface M.

The offset unit 40b is formed such that a distance between a region exceeding the opposite inclined surface S2 on an extension line of the core 30 intersecting the mirror surface M and the mirror surface M is longer than a distance between a region other than the region exceeding the opposite inclined surface S2 and the mirror surface M. The definition is for enabling the reflective film 7 to be accurately and simply formed by forming the offset unit 40b, as described below. A groove width Wb, in a direction perpendicular to the extension line of the core 30 intersecting the mirror surface M, of the offset unit 40b is set to two times or more that of a mode field of light that propagates through the core 30 to be projected onto the mirror surface M.

In addition, the reflective film 7 to be formed on the mirror surface M has a width and a height that are two times or more those of a mode field in the horizontal direction of the substrate 1 and the direction perpendicular to the horizontal direction of light that propagates through the core 30 to be projected onto the mirror surface M. After such structural setting is satisfied, the inclined groove 40a is filled with transparent resin in an infrared region. The distance to be defined for forming the offset unit 40b, the groove width Wb of the offset unit 40b, a size of the reflective film 7, and resin with which the inclined groove 40a is filled are effective to accurately make the formation of the reflective film 7 easy and make measures against stray light sufficient.

In the PLC 10B as the optical waveguide component having such a configuration, an optical signal inputted to the core 30 is flipped up by the reflective film 7 on the mirror surface M of the input-output unit IC in the optical path conversion unit 40 and is then incident on the PD 6. In the PD 6, if a crosstalk between channels is found based on a detection result of a light receiving intensity, a performance of measures against stray light using the offset structure can be evaluated. An evaluation result indicates that in the PLC 10B, only the optical signal is reflected by the reflective film 7 on the mirror surface M without stray light being reflected by the reflective film 7 on the mirror surface M by being inputted and outputted so that a crosstalk due to stray light can be suppressed. A specific example will be described below.

As an example, it is assumed that a mirror surface M at an angle of 45 degrees on which an optical path is converted by the optical path conversion unit 40 in the direction perpendicular to the horizontal direction of the substrate 1 is formed for the optical waveguide 20 on the upper surface of the substrate 1 in the PLC 10B and light that propagates through the optical waveguide 20 is flipped up by the mirror surface M. In this case, a distance between a center of a beam, in the direction perpendicular to the horizontal direction of the substrate 1, in the over clad 20b and an end of the mirror surface M is just 20 μm. To efficiently reflect the beam, a beam diameter in the case is paid attention to for a size viewed in a cross-sectional direction of the optical waveguide 20 for forming the reflective film 7 on the mirror surface M. The beam diameter represents an entire width in which an intensity of $1/e^2$ is obtained in a beam intensity distribution when a gaussian beam is assumed. The size of the reflective film 7 is desirably a width and a height that are two times or more those of the beam diameter in the horizontal direction of the substrate 1 and the direction perpendicular to the horizontal direction.

Generally, the beam diameter is approximately 10 μm. Thus, respective criteria of the width and the height of the reflective film 7 are 20 μm or more. Needless to say, the beam diameter represents the above-described mode field in the horizontal direction of the substrate 1 and the direction perpendicular to the horizontal direction of light that propagates through the core 30. Generally, to form the reflective film 7 on the mirror surface M of the inclined groove 40a, a method of applying evaporation, sputtering, or the like obliquely to the inclined surface S1 including the mirror surface M of the inclined groove 40a.

Further, to provide the reflective film 7 only in a reflective region, when evaporation, sputtering, or the like is applied, the reflective film 7 needs to be formed after a shielding mask for covering an unnecessary region is installed. Although a region requiring the reflective film 7 is a region of several ten micrometers, as described above, approximately 10 μm needs to also be expected as an error in work for loading the shielding mask. Accordingly, a transmissive region of the shielding mask needs to be increased. As a result, the reflective region is widened so that stray light is easily reflected by the reflective film 7. In such a case, a crosstalk occurs.

Work itself for installing the shielding mask is complicated, to deteriorate a PLC production efficiency. In the structure having measures against stray light to be provided with the light shielding unit 5 described with reference to FIG. 1, there is a problem that stray light remains within a plane of the optical waveguide 2 in the PLC 10A by reflection on a boundary surface of a light shielding groove with which a light shielding material is filled. There is also a problem that an additional space for providing the light shielding groove short of a mirror surface in the optical path conversion unit 4 is required.

On the other hand, in the PLC 10B according to the embodiment 1, the light conversion unit 40 is devised to have an offset structure. That is, in the light conversion unit 40, the local portion on the side of the core 30 of the inclined surface S1 in the inclined groove 40a is set as the mirror surface M, and the reflective film 7 is formed on only the mirror surface M. The offset unit 40b that communicates with the inclined groove 40a is formed on the side of the opposite inclined surface S2 opposing the mirror surface M. Thus, if the offset unit 40b that communicates with the inclined groove 40a exists, the reflective film 7 is easily formed.

Specifically, on the opposite inclined surface S2 on which the offset unit 40 is formed, an opening is widened when a target is obliquely installed in a direction in which evaporation, sputtering, or the like is performed than on the inclined surface S1 on which the mirror surface M is formed. Accordingly, the reflective film 7 is easily formed for the inclined surface S1 in an installation angular manner, and the reflective film 7 is formed by mainly targeting an upper region of the inclined surface S1. On the opposite inclined surface S2 on which the offset unit 40b exists, the offset unit 40b is a gas escape route made of a metal when the inclined surface S1 is coated with the reflective film 7 so that the reflective film 7 is not easily formed.

Then, when the extra reflective film 7 that has adhered to respective regions of the inclined surface S1 and the opposite inclined surface S2 is removed by milling, etching, or the like in a direction of the upper surface perpendicular to the horizontal direction of the substrate 1, the reflective film 7 is etched to a depth of a portion that has adhered to the upper region of the inclined surface S1. As a result, the reflective film 7 can be formed only on the mirror surface M opposing the offset unit 40b. When the reflective film 7 is formed on the mirror surface M in the inclined surface S1, the reflective film 7 is hardly formed on the opposite inclined surface S2.

A process for dropping the extra reflective film 7 by milling, etching, or the like in the direction of the upper surface of the substrate 1 in the PLC 10B is a process originally existing when the reflective film 7 is obliquely evaporated, and thus is not an additional process. When a procedure for producing the PLC 10B is employed, the reflective film 7 can be formed with high accuracy only in a required region without requiring a complicated process of installing a shielding mask.

In producing the PLC 10B, when the deeper inclined groove 40a than the core 30 is formed by etching, an etching rate decreases if the opening at the time of etching is small so that efficient processing is difficult to perform. In this respect, the same applies to a case where a structure in which only a groove of the offset unit 40b is formed. In consideration of the efficiency of the etching rate, a design having a certain opening is required.

If both the inclined groove 40a and a dedicated groove for the offset unit 40b are provided in the optical waveguide 20, like in the PLC 10B, the efficiency of the etching rate is increased. As a result, the reflective film 7 can be accurately formed on the mirror surface M as the local portion of the inclined surface S1. The groove width Wb of the offset unit 40b is the width or more of the reflective film 7, and is desirably two times or more that of the mode field of light that propagates through the core 30 to be projected onto the mirror surface M, as described above.

The depth of the inclined groove 40a in the direction perpendicular to the horizontal direction of the substrate 1 and a depth D of the groove of the offset unit 40b may be made substantially the same, and are desirably the set height or more of the reflective film 7. Further, a groove width Wa of the inclined groove 40a is desirably made larger than a depth of the mirror surface M in the direction perpendicular to the horizontal direction of the substrate 1. A specific example of a groove length Lb of the offset unit 40b illustrated in FIG. 3, together with a groove length La of the inclined groove 40a, will be described below.

Thus, if the offset unit 40b provided on the side of the opposite inclined surface S2 opposing the mirror surface M of the inclined groove 40a is used in the PLC 10B, a region where the reflective film 7 is formed on the mirror surface M can be limited simply and accurately. As a result, when the optical element is hybrid-integrated on the optical waveguide 20 including the optical path conversion unit 40 including the reflective film 7, an input and an output of the optical signal between the PLC 10B and the optical element can be optically coupled to each other by a low crosstalk.

For a method of manufacturing the PLC 10B, a specific example of a case where the optical waveguide 20 formed on the upper surface of the substrate 1 made of silicon in the quartz-based PLC 10B is improved will be described. As a preliminary matter, the size of the optical waveguide 20 is set to 5 mm in length representing a direction of the groove widths Wa and Wb, and 10 mm in breadth representing a direction of the groove length Lb, and the diameter of the core 30 is set to 3.5 μm. The film thickness of the over clad 20b viewed from the upper surface of the optical waveguide 20 in the core 30 is set to 16.5 μm, and the film thickness of the under clad 20a on the lower surface of the core 30 is set to 20 μm. Further, a refractive index difference between the core 30 and the under clad 20a or the over clad 20b is set to 2.5%. The entire PLC 10B is appropriately referred to as a chip regardless of the manufacturing processes of the PLC 10B.

In addition, optical input of the PLC 10B is performed from the core 30 on an end surface of the optical waveguide 20 on the side of one short side of the chip, and the optical path conversion unit 40 is formed at a position close to the end surface of the optical waveguide 20 on the side of the opposing other short side of the chip. The core 30 corresponds to eight channels provided at a pitch of 250 μm, and each of the channels has a waveguide structure having a substantially S shape from an optical input unit to the optical path conversion unit 40. The vicinity of the optical path conversion unit 40 in the core 30 is a portion extending in a linear shape.

For manufacturing processes of the PLC 10B, various well-known techniques can be applied to the process performed until the optical waveguide 20 is formed on the upper surface of the substrate 1, and the process is not a featured portion of the present invention, and hence description thereof is omitted.

Figure 4:
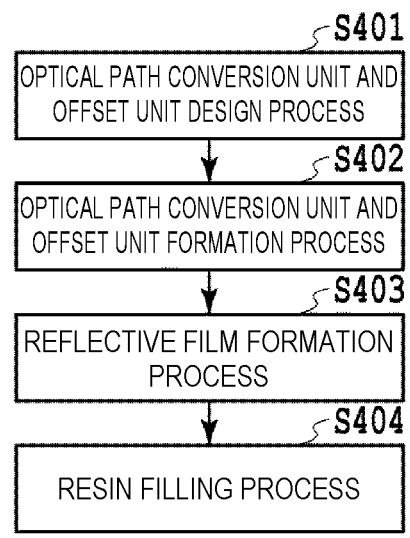
FIG. 4 is a flowchart illustrating processes for manufacturing the PLC according to the embodiment 1 for each stage.

FIG. 4 is a flowchart illustrating processes for manufacturing the PLC 10B according to the embodiment 1 for each stage.

With reference to FIG. 4, in the processes for manufacturing the PLC 10B, an optical path conversion unit and offset unit design process (step S401) is first performed. In the process, an inclination installation angle in forming the reflective film 7 on the mirror surface M is confirmed in addition to setting a mode field of light for making the inclined groove 40b of the optical path conversion unit 40 function as a mirror, a mirror angle, the groove length La, the groove width Wa, and the like. Simultaneously, the groove width Wb, the groove length Lb, the depth D, and the like in forming the offset unit 40b are confirmed.

Then, an optical path conversion unit and offset unit forming process (step S402) is performed. In this process, the inclined groove 40a for forming the optical path conversion unit is formed for the optical waveguide 20 according to a design content. That is, when the optical path conversion unit 40 is formed, the inclined groove 40a including the inclined surface S1 and the opposite inclined surface S2 is formed to be deeper than the core 30 in the direction intersecting the emission direction of the optical signal in the core 30 and perpendicular to the horizontal direction of the substrate 1 so that the optical path conversion unit 40 includes the input-output unit IO using the local portion of the inclined surface S1 on the side of the core 30 in the inclined groove 40a as the mirror surface M. At this time, an angle of the inclined surface S1 with respect to a horizontal plane defined in the horizontal direction of the substrate 1 may be a mirror angle, to form a mirror surface M at an angle of 45 degrees.

For example, a technique disclosed in Japanese Patent Laid-Open No. 2012-42515 is applied to formation of the inclined groove 40a including the inclined surface S1 and the opposite inclined surface S2 so that a depth of the inclined groove 40a is made larger than that of the core 30 by dry etching. Although formation of the inclined surface S1 and the opposite inclined surface S2 of the inclined groove 40a does not directly contribute to a function and effect of the present invention, a mirror layout having a high accuracy and having a high degree of freedom is possible if the inclined surface S1 and the opposite inclined surface S2 are produced by dry etching. The inclined groove 40a has the groove width Wa, as described above.

Simultaneously, the offset unit 40b is formed to communicate with the inclined groove 40a for the optical waveguide 20. When the offset unit 40b is formed, a dedicated groove is provided on the side of the opposite inclined surface S2 opposing the mirror surface M of the inclined groove 40a so that the groove is the offset unit 40b in the horizontal direction of the substrate 1. The groove of the offset unit 40b is provided such that its groove length Lb is larger than its groove width Wb in a region on the extension line of the core 30.

The offset unit 40b is formed such that the distance between the region exceeding the opposite inclined surface S2 on the extension line of the core 30 intersecting the mirror surface M and the mirror surface M is longer than the distance between the region other than the region exceeding the opposite inclined surface S2 and the mirror surface M, as described above. The groove width Wb in the direction perpendicular to the extension line of the core 30 intersecting the mirror surface M of the offset unit 40b is set to two times or more that of the mode field of light that propagates through the core 30 to be projected onto the mirror surface M.

For the respective sizes of the inclined groove 40a and the offset unit 40b, the groove width Wa of the inclined groove 40a is set to 2000 μm, and the groove width Wb of the offset unit 40b in the same direction is set to 25 μm. The groove length Lb of the offset unit 40b on the extension line of the core 30 is set to 250 μm, and the groove length La of the inclined groove 40a in the same direction is set to 50 μm. The optical path conversion unit 40a and the offset unit 40b can also be separately formed, although generally simultaneously formed.

Further, a reflective film formation process (step S403) is performed. In this process, an angle formed between an input-output direction of an optical signal in the input-output unit IC in the core 30 intersecting the mirror surface M and the horizontal plane to be defined in the horizontal direction of the substrate 1 is used as a reference. The reflective film 7 is formed for the inclined surface S1 using the mirror surface M as a target via the offset unit 40b from the angle. At this time, the reflective film 7 may be formed for the inclined surface S1 via the offset unit 40b by bringing the chip into an inclined state at the angle and holding the inclination installation angle.

Thus, the inclined surface S1 is coated with a metal such as gold or aluminum via the offset unit 40b in a direction at the set angle by evaporation, sputtering, or the like, to form the reflective film 7 on the mirror surface M. The reflective film 7 is formed to function as a mirror for converting an optical path of a beam to be incident or emitted in the input-output unit IC on the side of the inclined surface S1 in the core 30. The reflective film 7 is formed for the inclined surface S1 at an angle of 45 degrees.

Specifically, setting for inclining the chip at an angle of degrees in a direction of the depth D of the groove in the direction perpendicular to the horizontal plane of the substrate 1 with respect to an evaporation source or a sputtering target can be illustrated. In this setting, when the reflective film 7 is formed on the inclined surface S1 via the offset unit 4b in a direction at an angle of 8 degrees inclined toward the short side of the chip, the reflective film 7 is formed only at a shallower depth than that of the core 30 in the other region. The chip is milled using an Ar beam in the direction of the upper surface perpendicular to the horizontal direction of the substrate 1 to grind a surface of the optical waveguide 20, and an extra portion of the reflective film 7 formed in the respective regions of the inclined surface S1 and the opposite inclined surface S2 of the inclined groove 40a is removed.

Figure 5:
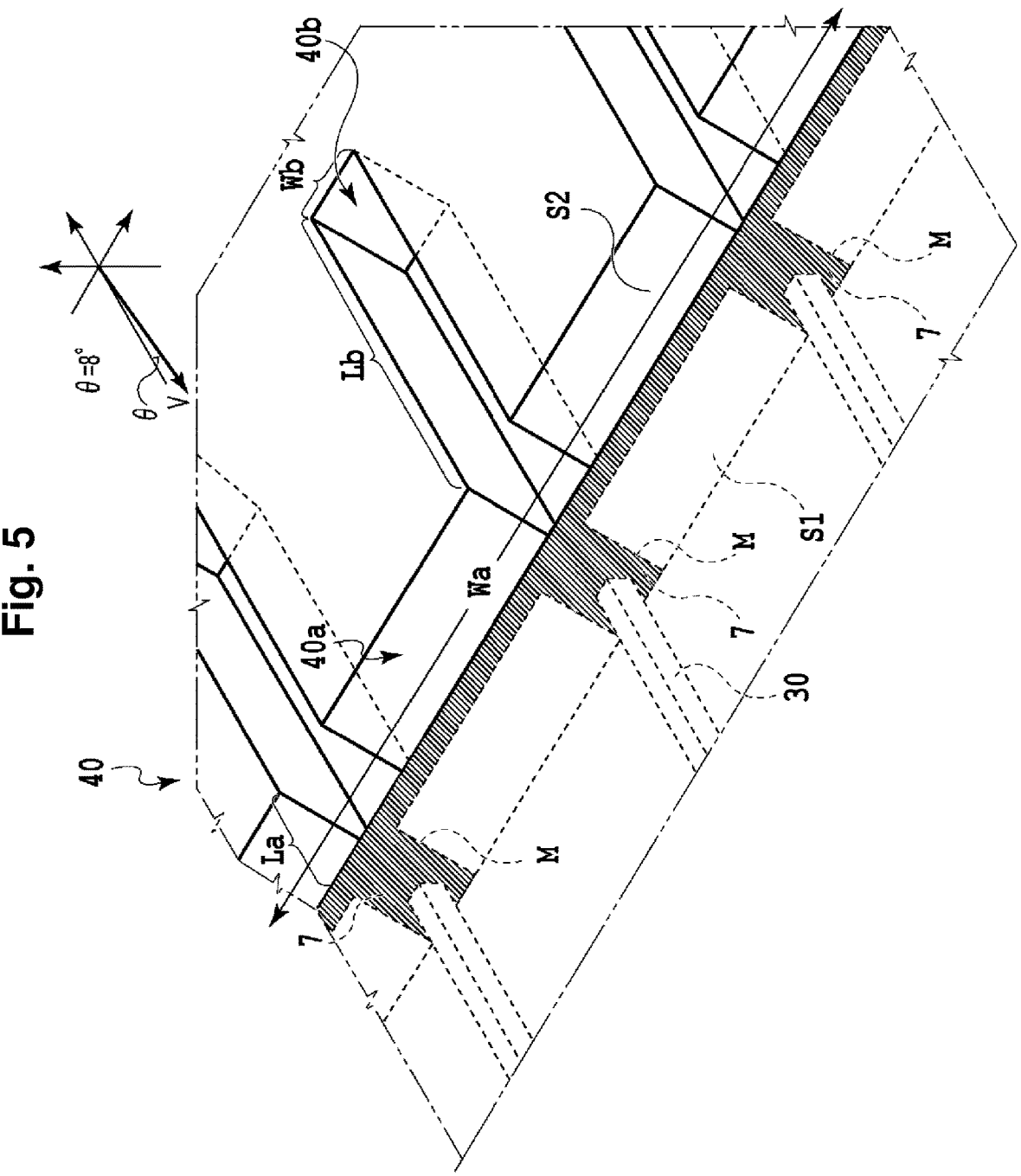
FIG. 5 is an enlarged perspective view illustrating, partly in section and in phantom, how the optical path conversion unit as a principal part of the PLC is after a reflective film formation process in FIG. 4.

FIG. 5 is an enlarged perspective view illustrating, partly in section and in phantom, how the optical path conversion unit 40 as a principal part of the PLC 10B is after the reflective film formation process (step S403) in FIG. 4. With reference to FIG. 5, it is illustrated how the extra portion of the reflective film 7 remains in the upper region of the inclined surface S1 after the reflective film formation process (step S403) in FIG. 4.

The extra portion of the reflective film 7 formed in the upper region of the inclined surface S1 is removed to a depth of the portion by milling the chip in the direction of the upper surface perpendicular to the horizontal direction of the substrate 1. As a result, the reflective film 7 is formed on only the mirror surface M opposing the offset unit 40b. In FIG. 5, an angle θ of 8 degrees, by which the chip is inclined, set in the reflective film formation process (step S403) is illustrated. The angle θ can be considered to represent a coating direction V of the reflective film 7, although the above-described inclination installation angle. When the reflective film 7 is formed, a film is hardly actually formed on the opposite inclined surface S2, although it can also be formed thereon. Even if a relatively thin film has been formed, the extra portion can be sufficiently removed by performing a finishing process, described below.

In short, in the reflective film formation process (step S403), the finishing process is performed after the reflective film 7 is formed on the inclined surface S1 of the inclined groove 40a. In the finishing process, a surface of the optical waveguide 20 is ground in the direction of the upper surface of the chip, and the extra portion of the reflective film 7 formed on the surface of the inclined groove 40a is removed. In the embodiment 1, almost all of the extra portion of the reflective film 7 exists in the upper region of the inclined surface S1. As a result, the reflective film 7 is formed to have a width and a height that are two times or more those of the mode field in the horizontal direction of the substrate 1 and the direction perpendicular to the horizontal direction of light that propagates through the core 30 to be projected onto the mirror surface M.

Finally, in a resin filling process (step S404), the inclined groove 40a after the formation of the reflective film 7 is filled with transparent resin in an infrared region.

Accordingly, when the surface-type PD 6 having a light receiving diameter of 50 μm is mounted on the produced PLC 10B, the PD 6 is arranged such that a center of a beam to be emitted in the direction perpendicular to the horizontal direction of the substrate 1 from the optical path conversion unit 40 and a light receiving center of the PD 6 match each other. The PD 6 is loaded into the optical path conversion unit 40 in the PLC 10B such that a height of 5 μm is a light receiving surface of the light reception unit R in the PD 6 with an upper surface of the over clad 20b used as a reference. Resin with which the inclined groove 40a is filled in the resin filling process (step S404) functions to fix the PD 6.

Figure 6:
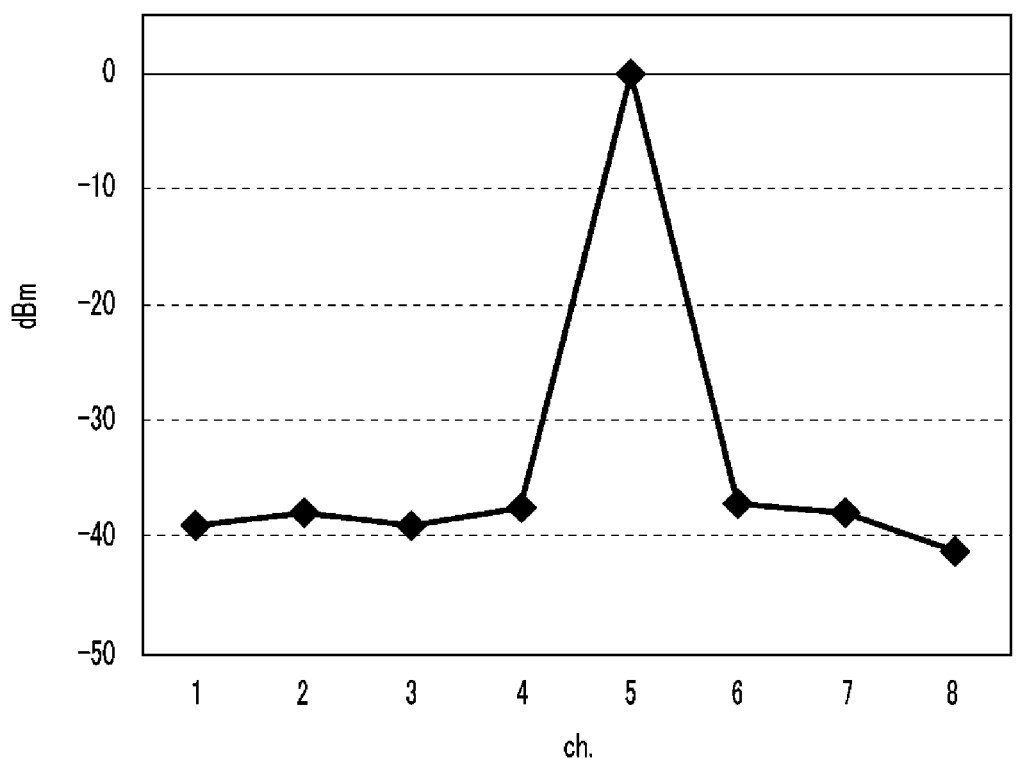
FIG. 6 is a characteristic view illustrating a result of measuring for each channel a light receiving intensity of the PD when light has been inputted to only the specific channel of a core in an optical waveguide in the PLC according to the embodiment 1.

Light having a wavelength of 1.55μ is inputted using an optical fiber to the core 30 in the optical waveguide 20 in the PLC 10B, and a light receiving intensity of the PD 6 is measured for each channel, to examine a result of plotting. FIG. 6 is a characteristic view illustrating a result of measuring the light receiving intensity of the PD 6 for each channel when light has been inputted only to the specific channel 5 of the core 30 in the optical waveguide 20 in the PLC 10B.

With reference to FIG. 6, it is determined that as the light receiving intensity when light having a wavelength of 1.55 μm has been inputted only to the channel 5 of the core 30, a higher light receiving intensity of 38 dBm or more than the light receiving intensity for the other channel has been ensured. This is considered to be a result of being able to simply form the reflective film 7 only in a required region of the inclined surface S1, like in the PLC 10B according to the embodiment 1. Such a configuration enables stray light to be reflected toward the upper surface of the substrate 1 by the reflective film 7 in the optical path conversion unit 40 to be suppressed.

The inclined groove 40a is filled with transparent resin so that stray light within a plane in the horizontal direction of the optical waveguide 20 passes through the inclined groove 40a without being reflected toward the upper surface of the substrate by the inclined groove 40a. As such a result, a crosstalk between the PLC 10B and the PD 6 can be suppressed.

Figure 7:
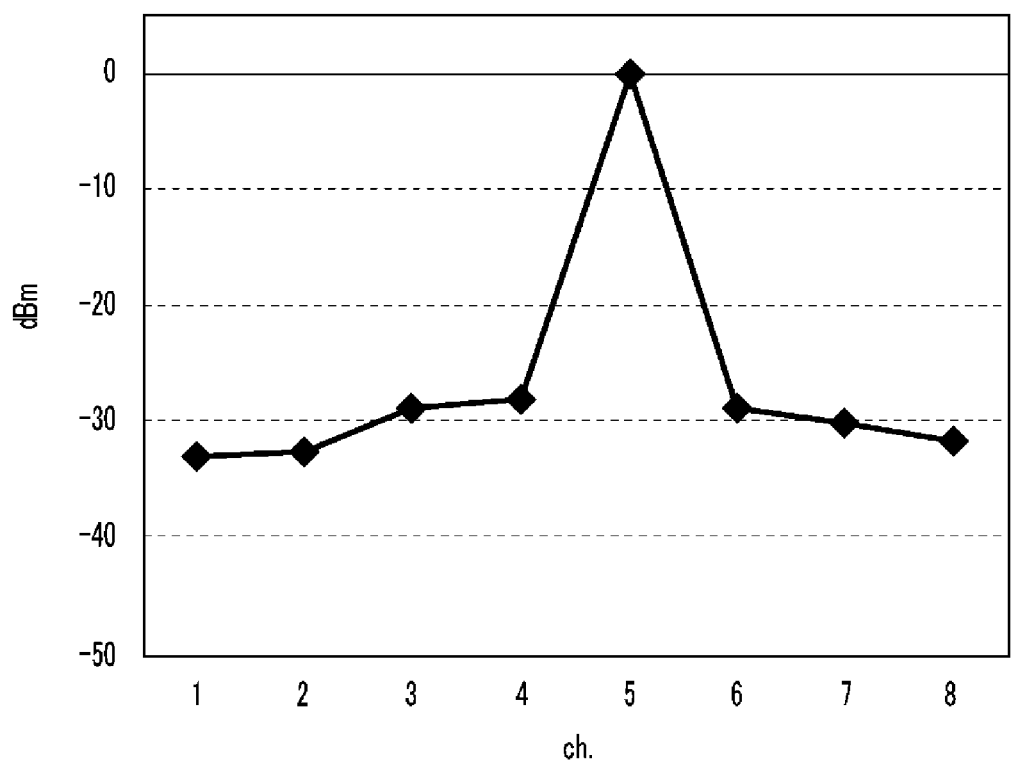
FIG. 7 is a characteristic view illustrating a result of measuring for each channel a light receiving intensity of a PD when light has been inputted to only the specific channel of a core in an optical waveguide in a PLC according to a comparative example.

On the other hand, as a comparative example, a PLC as an optical waveguide component including an optical path conversion unit by a linear mirror not including an offset unit 40b is produced, and a PD 6 is loaded into the optical path conversion unit in the PLC. FIG. 7 is a characteristic view illustrating a result of measuring for each channel a light receiving intensity of the PD 6 when light has been inputted only to the specific channel 5 of a core 30 in an optical waveguide 20 in the PLC according to the comparative example.

With reference to FIG. 7, when light having a wavelength of 1.55 μm is inputted only to the channel 5 of the core 30, a light receiving intensity of another channel to which light has not been inputted more increases as a whole than in the characteristic illustrated in FIG. 6 so that it is expected that a crosstalk occurs. Particularly, it is determined that respective light receiving intensities of a channel 4 and a channel 6 adjacent to the channel 5 increase to a light receiving intensity of approximately 30 dBm. This is considered to be a result of stray light being reflected toward an upper surface of a substrate 1 to cause a crosstalk.

By comparison between respective characteristics illustrated in FIG. 6 and FIG. 7 described above, an effect of an improvement in a crosstalk in the PLC 10B according to the embodiment 1 can be confirmed. That is, if an optical waveguide component employing the offset structure and including the optical path conversion unit 40 including the produced reflective film 7, like the PLC 10B according to the embodiment 1, is used, an optical device having an unprecedented low crosstalk characteristic can be provided.

As a result, the optical waveguide component according to the embodiment 1 can implement highly efficient optical coupling of the optical element and can suppress the crosstalk between the channels in performing hybrid integration.

In the manufacturing method, the optical waveguide component having such a performance can be produced accurately and simply.

Embodiment 2

Figure 8:
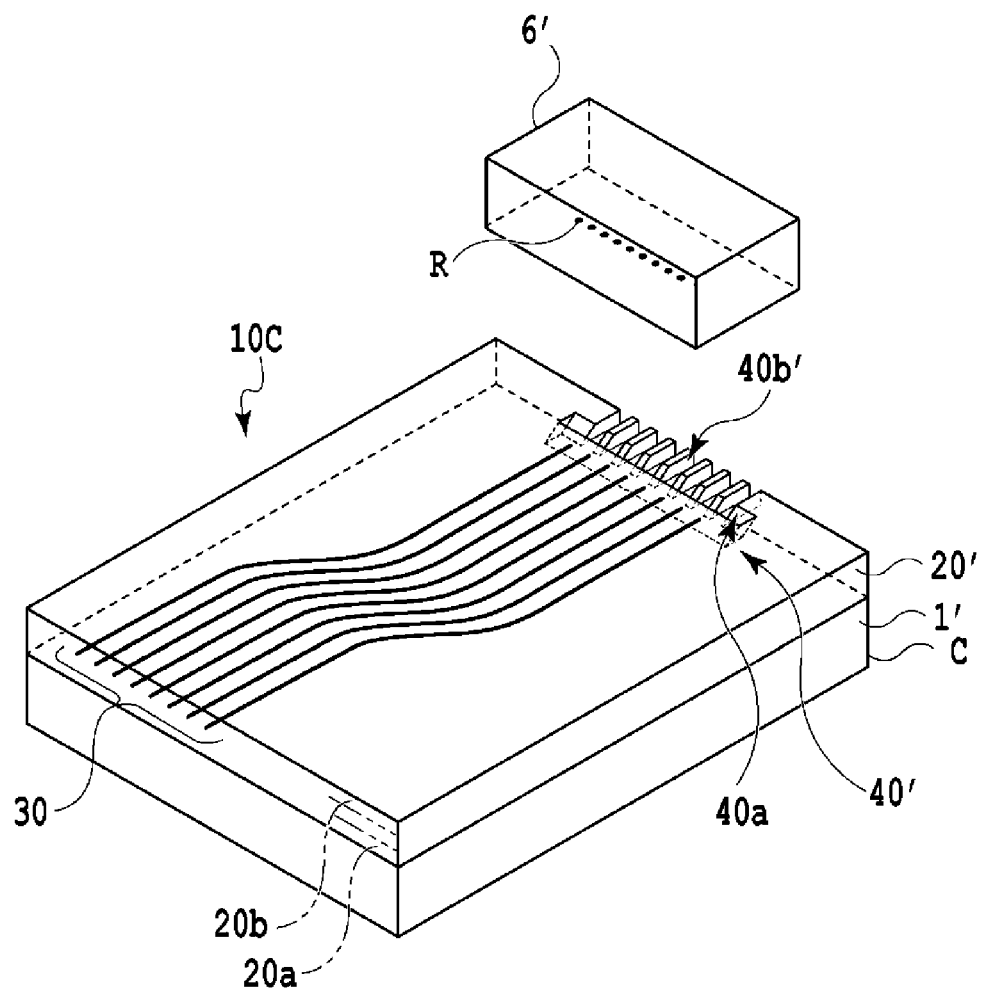
FIG. 8 is a perspective view illustrating a PLC employing an offset structure as an optical waveguide component that is an optoelectronic integration-type device according to an embodiment 2 of the present invention, including a PD as an optical element to be mounted.

FIG. 8 is a perspective view illustrating a PLC 10C employing an offset structure as an optical waveguide component that is an optoelectronic integration-type device according to an embodiment 2 of the present invention, including a PD 6' as an optical element to be mounted. In the PLC 10C according to the embodiment 2, similar components to those in the PLC 10B according to the embodiment 1 are assigned the same reference numerals and hence description thereof is omitted, and different components will be mainly described.

With reference to FIG. 8, the PLC 10C according to the embodiment 2 differs from the PLC 10B according to the embodiment 1 in a detailed structure of an optical path conversion unit 40'. That is, an offset unit 40b' in the optical path conversion unit 40' is formed such that its wall surface is chipped on the side of an opposite inclined surface S2 on an extension line of a core 30 intersecting a mirror surface M.

To achieve such a configuration, an end surface of a short side, in the vicinity of the optical path conversion unit 40', of a chip of the PLC 10C is cut to be a cut surface C. The core 30 existing on an end surface of a short side of an optical waveguide 20' opposing the cut surface C is for optical input. Accordingly, the chip of the PLC 10C has a size in a longitudinal direction slightly larger than that of the chip of the PLC 10B by previously anticipating a cut portion.

In the PLC 10C illustrated in FIG. 8, when the end surface of the short side on the front side is for optical input of the core 30, the optical path conversion unit 40' is also formed on the emission side of the core 30 in the optical waveguide 20'. Further, the PD 6' to be loaded into the optical path conversion unit 40' differs from the PD 6 in a light receiving diameter. The PLC 10C is similar to the PLC 10B in other components and a setting requirement on the components.

Figure 9:
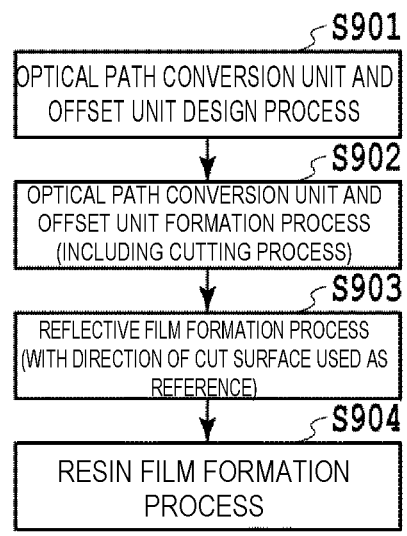
FIG. 9 is a flowchart illustrating processes for manufacturing the PC according to the embodiment 2 for each stage.

FIG. 9 is a flowchart illustrating processes for manufacturing the PLC 10C according to the embodiment 2 for each stage.

With reference to FIG. 9, in the processes for manufacturing the PLC 10C, an optical path conversion unit and offset unit design process (step S901) is first performed, like in the embodiment 1. Here, in addition to performing various types of setting for making the inclined groove 40b in the optical path conversion unit function as a mirror, a size in forming the offset unit is confirmed. An inclination installation angle in forming a reflective film 7 on the mirror surface M is not required. This will be described below.

Then, an optical path conversion unit and offset unit formation process (step S902) is performed. Here, an inclined groove 40a for forming the optical path conversion unit is formed for the optical waveguide, like in the PLC 10B, according to a design content. A constitutional requirement at the time of forming the optical path conversion unit is similar to that in the PLC 10B, where a mirror surface M at an angle of 45 degrees is also formed.

Simultaneously, the offset unit is formed to communicate with the inclined groove 40a for the optical waveguide. A constitutional requirement at the time of forming the offset unit is also similar to that in the PLC 10B.

The optical path conversion unit and offset unit formation process (step S902) includes a cutting process for cutting the chip after the formation of the offset unit in a direction perpendicular to a horizontal direction of the substrate. The cutting process is for cutting the chip by dicing, cleavage, or the like in the direction perpendicular to the horizontal direction of the substrate, as viewed from a surface of the PLC 10C. When the cutting process is performed, an offset unit 40b' is formed such that the wall surface is chipped on the side of the opposite inclined surface S2 on the extension line of the core 30. The optical path conversion unit 40' in which the substrate 1', the optical waveguide 20', and the offset unit 40b' are formed is produced by performing the cutting process.

Further, in a reflective film formation process (step S903), a reflective film 7 is formed for an inclined surface S1 using the mirror surface M as a target with the cut surface C of the offset unit 40b' in the cutting process used as a reference via the offset unit 40b' from the cut surface C. Specifically, the inclined surface S1 is coated with a metal such as gold or aluminum by evaporation, sputtering, or the like via the offset unit 40b' in the direction perpendicular to the cut surface C to form the reflective film 7 on the mirror surface M. The cut surface C is a direction perpendicular to a horizontal plane of the substrate 1', to expose the offset unit 40b'. Accordingly, the chip need not be inclined. The reflective film 7 is also formed to function as a mirror for converting an optical path of a beam to be incident or emitted in the input-output unit IC on the side of the inclined surface S1 of the core 30.

Figure 10:
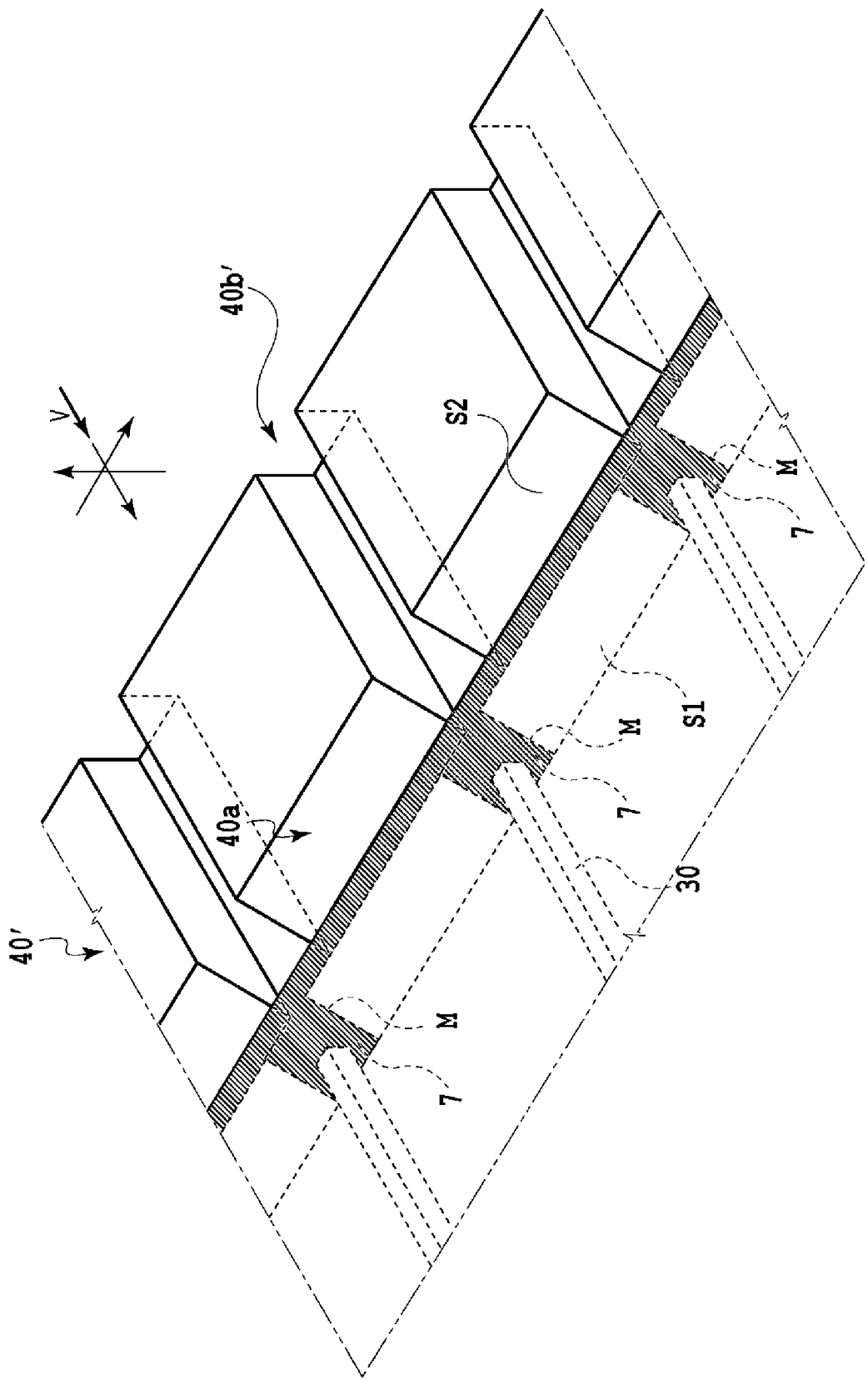
FIG. 10 is an enlarged perspective view illustrating, partly in section and in phantom, how an optical path conversion unit as a principal part of the PLC is after a reflective film formation process in FIG. 9.

FIG. 10 is an enlarged perspective view illustrating, partly in section and in phantom, how the optical path conversion unit 40' as a principal part of the PLC 10C is after the above-described reflective film formation process (step S903). With reference to FIG. 10, it is illustrated how a groove of the offset unit 40b' the wall surface of which is chipped on the side of the opposite inclined surface S2 on the extension line of the core 30 is formed and the inclined surface S1 is coated with a metal in a coating direction V of the reflective film 7 via the offset unit 40b'. As a result, a state where the reflective film 7 is formed on only the inclined surface S1 opposing the offset unit 40b' is illustrated.

In the reflective film formation process (step S903), a finishing process is also preferably performed after the reflective film 7 is formed on the inclined surface S1 of the inclined groove 40a. In the finishing process, an extra portion of the reflective film 7 formed on a surface of the inclined groove 40a is ground and removed in a direction of an upper surface of the chip. On the opposite inclined surface S2 on which the offset unit 40b' exists, the offset unit 40b' having no wall surface on the extension line of the core 30 is an efficient gas escape route of metal gas for forming the reflective film 7. Accordingly, the reflective film 7 is not more easily formed.

Thus, in the embodiment 2, the extra portion hardly exists when the reflective film 7 is formed. However, the possibility that a thin film is slightly formed cannot be completely eliminated. Accordingly, the performance of the finishing process is effective to remove the thin film. As a result, the reflective film 7 is formed to have a width and a height that are two times or more those of a mode field in the horizontal direction of the substrate 1' and the direction perpendicular to the horizontal direction of light that propagates through the core 30 to be projected onto the mirror surface M.

Finally, in a resin filling process (step S904), the inclined groove 40a after the formation of the reflective film 7 is filled with transparent resin in an infrared region.

Accordingly, when the surface-type PD 6' having a light receiving diameter of 50 μm is mounted on the produced PLC 10C, the PD 6' is arranged such that a center of a beam to be emitted in the direction perpendicular to the substrate 1' from the optical path conversion unit 40' and a light receiving center of the PD 6' match each other. The PD 6' is loaded into the optical path conversion unit 40' in the PLC 10C such that a height of 5 μm is a light receiving surface of the light reception unit R in the PD 6' with an upper surface of an over clad 20b used as a reference. Resin with which the inclined groove 40a is filled in the resin filling process (step S904) functions to fix the PD 6'.

Figure 11:
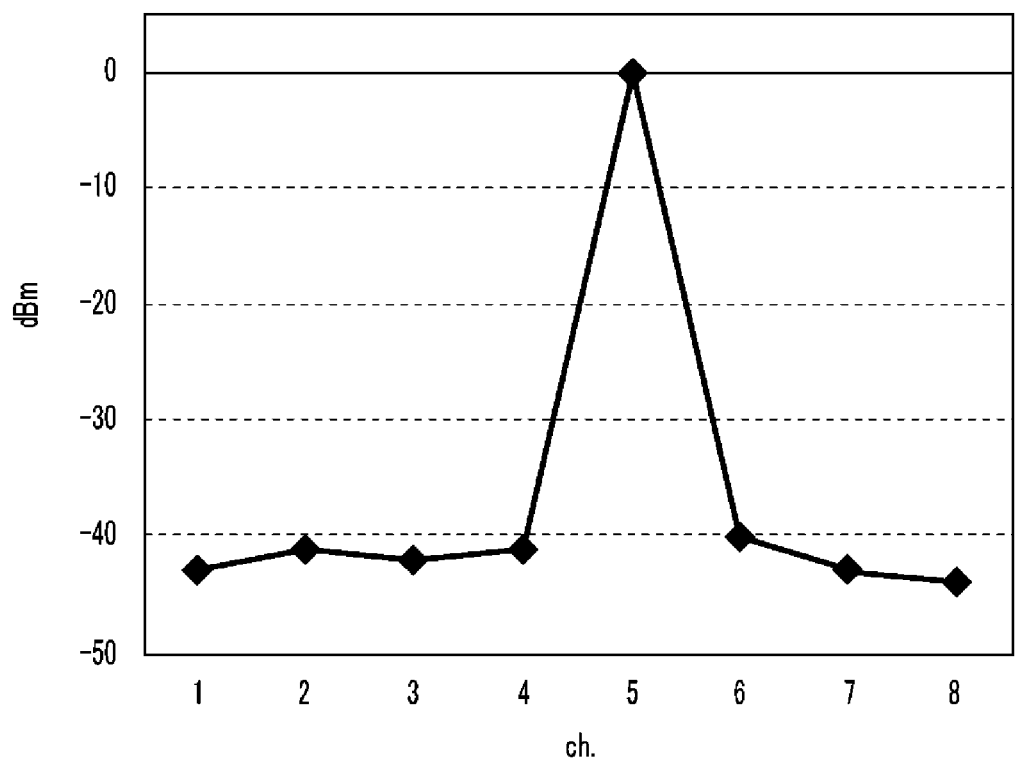
FIG. 11 is a characteristic view illustrating a result of measuring for each channel a light receiving intensity of a PD when light has been inputted to only the specific channel of a core of an optical waveguide in the PLC according to the embodiment 2.

Light having a wavelength of 1.55μ is inputted using an optical fiber to the core 30 in the optical waveguide 20' in the PLC 10C, and a light receiving intensity of the PD 6' is measured for each channel, to examine a result of plotting. FIG. 11 is a characteristic view illustrating a result of measuring for each channel the light receiving intensity of the PD 6' when light has been inputted only to the specific channel 5 of the core 30 in the optical waveguide 20' in the PLC 10C.

With reference to FIG. 11, it is determined that as a light receiving intensity when light having a wavelength of 1.55 μm has been inputted only to the channel 5 of the core 30, a higher light receiving intensity of 40 dBm or more than a light receiving intensity for the other channel has been ensured. This is considered to be a result of being able to simply form the reflective film 7 only in a required region of the inclined surface S1, like in the PLC 10B according to the embodiment 1. Such a configuration enables stray light to be reflected toward an upper surface of the substrate 1' by the reflective film 7 in the optical path conversion unit 40' to be suppressed.

The inclined groove 40a is also filled with transparent resin so that stray light within a plane in the horizontal direction of the optical waveguide 20' passes through the inclined groove 40a without being reflected on the upper surface of the substrate 1' by the inclined groove 40a. As such a result, a crosstalk between the PLC 10C and the PD 6' can be suppressed.

In addition, in the PLC 10C according to the embodiment 2, the opposite inclined surface S2 of the inclined groove 40a remains uncoated with the reflective film 7 from an observation result. Accordingly, it is considered that an effect of suppressing a high crosstalk is more produced because there is no extra portion of the reflective film 7 in the PLC 10C than in the PLC 10B according to the embodiment 1 in which an extra portion of the reflective film 7 may slightly remain in the upper region of the inclined surface S1. That is, if the optical waveguide component employing the offset structure and including the produced optical path conversion unit 40', like the PLC 10C according to the embodiment 2, is used, an optical device having an unprecedented lower crosstalk characteristic can be provided.

As a result, the optical waveguide component according to the embodiment 2 can also implement highly efficient optical coupling of an optical element and suppress a crosstalk between the channels in performing hybrid integration. In a method of manufacturing the optical waveguide component, the optical waveguide component having such a performance can be produced accurately and simply.

The optical path conversion unit and offset unit formation process (step S902) illustrated in FIG. 9 can be replaced with the optical path conversion unit and offset unit formation process (step S402) illustrated in FIG. 4 according to the embodiment 1. In the case, in the optical path conversion unit and offset unit design process (step S402), the inclination installation angle in forming the reflective film 7 on the mirror surface M need not be confirmed. In the reflective film formation process (step S402), the reflective film 7 is formed on the mirror surface M via the offset unit 40b' with the cut surface C used as a reference. If it is assumed that a chip of a slightly larger size in a longitudinal direction is used by previously anticipating a cut portion, the PLC 10C according to the embodiment 2 can be produced instead of the PLC 10B according to the embodiment 1.

The present invention is not limited to the above-described embodiments, but various modifications can be made without departing from the technical scope of the invention, and all technical matters included in the technical idea described in the claims are covered by the present invention. Although each of the above-described embodiments is a preferable example, those skilled in the art can implement various modifications from a disclosed content. In such a case, these are intended to be included in the appended claims.

REFERENCE SIGNS LIST 1, 1' Substrate (wafer)
2, 20, 20' Optical waveguide
2a, 20a Under clad
2b, 20b Over clad
3, 30 Core
4, 40, 40' Optical path conversion unit
40a Inclined groove
40b, 40b' Offset unit
5 Light shielding unit
6, 6' PD
7 Reflective film
10A, 10B, 10C PLC
C Cut surface
D Depth
IO Input-output unit
La, Lb Groove length
M Mirror Surface
S1 Inclined surface
S2 Opposite inclined surface
V Coating direction
Wa, Wb Groove width
θ Angle

The invention claimed is:

1. An optical waveguide component comprising an optical waveguide provided on an upper surface of a substrate and including a core and a clad covering the core and an optical path conversion unit that is formed in a part of the optical waveguide and converts an optical path of an optical signal and inputs and outputs the optical signal to and from an optical element to be mounted, wherein the optical path conversion unit comprises an input-output unit using as a mirror surface a local portion of an inclined surface on the side of the core in an inclined groove formed to be deeper than the core in a direction intersecting an emission direction of the optical signal in the core and perpendicular to a horizontal direction of the substrate, an offset unit in the horizontal direction of the substrate is provided to communicate with the inclined groove on the side of an opposite inclined surface opposing the mirror surface in the inclined groove, and the offset unit is formed such that a distance between a region exceeding the opposite inclined surface on an extension line of the core intersecting the mirror surface and the mirror surface is longer than a distance between a region other than the region exceeding the opposite inclined surface and the mirror surface.

2. The optical waveguide component according to claim 1, wherein a groove width, in a direction perpendicular to the extension line of the core intersecting the mirror surface, of the offset unit is two times or more than that of a mode field of light that propagates through the core to be projected onto the mirror surface.

3. The optical waveguide component according to claim 2, further comprising a reflective film formed on the mirror surface and having a width and a height that are two times or more than those of a mode field in a horizontal direction of the substrate and a direction perpendicular to the horizontal direction of light that propagates through the core to be projected onto the mirror surface.

4. The optical waveguide component according to claim 2, wherein the offset unit is formed such that its wall surface is chipped on the side of the opposite inclined surface on the extension line of the core intersecting the mirror surface.

5. The optical waveguide component according to claim 1, further comprising a reflective film formed on the mirror surface and having a width and a height that are two times or more than those of a mode field in a horizontal direction of the substrate and a direction perpendicular to the horizontal direction of light that propagates through the core to be projected onto the mirror surface.

6. The optical waveguide component according to claim 5, wherein the offset unit is formed such that its wall surface is chipped on the side of the opposite inclined surface on the extension line of the core intersecting the mirror surface.

7. The optical waveguide component according to claim 1, wherein the offset unit is formed such that its wall surface is chipped on the side of the opposite inclined surface on the extension line of the core intersecting the mirror surface.

8. A method of manufacturing an optical waveguide component comprising an optical waveguide provided on an upper surface of a substrate and including a core and a clad covering the core and an optical path conversion unit that is formed in a part of the optical waveguide and converts an optical path of an optical signal and inputs and outputs the optical signal to and from an optical element to be mounted, the method comprising:
an optical path conversion unit formation step for forming for the optical waveguide an inclined groove to be deeper than the core in a direction intersecting an emission direction of the optical signal in the core and perpendicular to a horizontal direction of the substrate and forming the optical path conversion unit to include an input-output unit using as a mirror surface a local portion of an inclined surface on the side of the core in the inclined groove; and
an offset unit formation step for providing for the optical waveguide a groove on the side of an opposite inclined surface opposing the mirror surface of the inclined groove and forming an offset unit in the horizontal direction of the substrate to communicate with the inclined groove,
wherein in the offset unit formation step, the offset unit is formed such that a distance between a region exceeding the opposite inclined surface on an extension line of the core intersecting the mirror surface and the mirror surface is longer than a distance between a region other than the region exceeding the opposite inclined surface and the mirror surface.

9. The method of manufacturing the optical waveguide component according to claim 8, wherein in the offset unit formation step, the offset unit is formed such that a groove width, in a direction perpendicular to the extension line of the core intersecting the mirror surface, of the offset unit is two times or more than that of a mode field of light that propagates through the core to be projected onto the mirror surface.

10. The method of manufacturing the optical waveguide component according to claim 9, further comprising:
a reflective film formation step for forming a reflective film for the inclined surface using the mirror surface as a target with an angle formed between an input-output direction of the optical signal in the input-output unit of the core intersecting the mirror surface and a horizontal plane to be defined in a horizontal direction of the substrate via the offset unit from the angle,
wherein in the reflective film formation step, the reflective film is formed by grinding a surface of the optical waveguide in a direction of an upper surface perpendicular to the horizontal direction of the substrate and removing an extra portion of the reflective film formed in an upper region of the inclined surface to have a width and a height that are two times or more those of a mode field in the horizontal direction of the substrate and the direction perpendicular to the horizontal direction of light that propagates through the core to be projected onto the mirror surface.

11. The method of manufacturing the optical waveguide component according to claim 8, further comprising:
a reflective film formation step for forming a reflective film for the inclined surface using the mirror surface as a target with an angle formed between an input-output direction of the optical signal in the input-output unit of the core intersecting the mirror surface and a horizontal plane to be defined in a horizontal direction of the substrate via the offset unit from the angle,
wherein in the reflective film formation step, the reflective film is formed by grinding a surface of the optical waveguide in a direction of an upper surface perpendicular to the horizontal direction of the substrate and removing an extra portion of the reflective film formed in an upper region of the inclined surface to have a width and a height that are two times or more those of a mode field in the horizontal direction of the substrate and the direction perpendicular to the horizontal direction of light than that propagates through the core to be projected onto the mirror surface.

12. The method of manufacturing the optical waveguide component according to claim 11, wherein
the offset unit formation step includes a cutting process for cutting, to form an offset unit such that its wall surface is chipped on the side of the opposite inclined surface on the extension line of the core intersecting the mirror surface, the optical waveguide component after the offset unit is formed in the direction perpendicular to the horizontal direction of the substrate, and
the reflective film formation step includes forming the reflective film for the inclined surface using the mirror surface as a target with a cut surface in the cutting process used as a reference via the offset unit in a direction of the cut surface.

\* \* \* \* \*